United States Patent [19]

Furlong

[11] Patent Number: 5,115,451
[45] Date of Patent: May 19, 1992

[54] LOCAL AREA NETWORK MODEM

[75] Inventor: Darrell Furlong, Uxbridge, Mass.

[73] Assignee: Concord Communications, Inc., Marlboro, Mass.

[21] Appl. No.: 257,858

[22] Filed: Oct. 14, 1988

[51] Int. Cl.[5] .............................................. H04B 1/38
[52] U.S. Cl. ........................................ 375/7; 375/98; 370/15
[58] Field of Search ........................................ 375/7-9, 375/98, 118, 3, 4; 455/86, 87, 68, 246, 247; 370/15; 371/20.5, 22.3, 22 C, 97, 85.5, 85.15, 85.12

[56] References Cited

U.S. PATENT DOCUMENTS

| | | | |
|---|---|---|---|
| 4,425,665 | 1/1984 | Stauffer | 375/9 |
| 4,536,874 | 8/1985 | Stoffel et al. | 370/94 |
| 4,554,673 | 11/1985 | Stevens | 375/118 |
| 4,590,468 | 5/1986 | Steiglitz | 370/94 |
| 4,596,026 | 6/1986 | Cease | 375/118 |
| 4,623,934 | 11/1986 | Taylor | 375/8 |
| 4,691,342 | 9/1987 | Waldron et al. | 375/9 |

OTHER PUBLICATIONS

Patent Abstracts of Japan, vol. 10, No. 46, (E-383), (2103), Feb. 22, 1986, & JP, A, 60200636 (Hitachi Seisakusho K.K.) 11 Oct. 1985.
Patent Abstracts of Japan, vol. 7, No. 186 (E-193) (1331), Aug. 16, 1983, & JP, A, 5888945 (Ricoh K.K.) May 27, 1983.
Token Passing Bus Access Method and Physical Layer Specification IEEE Std 802.4-1985 (1985), pp. 19-26, 42-53, 54-76.
Devon, M., "The User's Guide to MAPBroadband: High Speed LAN Data Transmission Oversee CATV Networks", (1985).
Klein, M. T., "IEEE 802.4 Standards for Factory Communication: An Overview", (1985).
Stallings, W., "A Tutorial on the IEEE 802 Local Networks Standards", (1986).

Primary Examiner—Stephen Chin
Attorney, Agent, or Firm—Cesari and McKenna

[57] ABSTRACT

A local area network modem which meets the stringent signalling requirements of the IEEE 802.4 standard. The modem supports loopback commands by insuring that the receiver and transmitter portions are in phase-synchronism, regardless of the physical distance between the modem and upper layer control circuitry. The transmitter also uses only two digital signal wires to specify which of a number of functions are to be performed by the transmitter analog components. An automatic gain control (AGC) circuit is included which eliminates a number of problems associated with prior designs. In particular, the modem's receiver monitors itself to automatically correct drift in phase and gain control adjustment, without intervention from the upper layer.

4 Claims, 5 Drawing Sheets

| Tx, Ty | ENC OUT |
|---|---|
| t _ 4 | PREVIOUS + OR − |
| t _ 0 | OPPOSITE OF PREVIOUS + OR − |
| t _ ON | PREVIOUS + OR − |
| t _ OFF | NOTHING |

FIG. 2

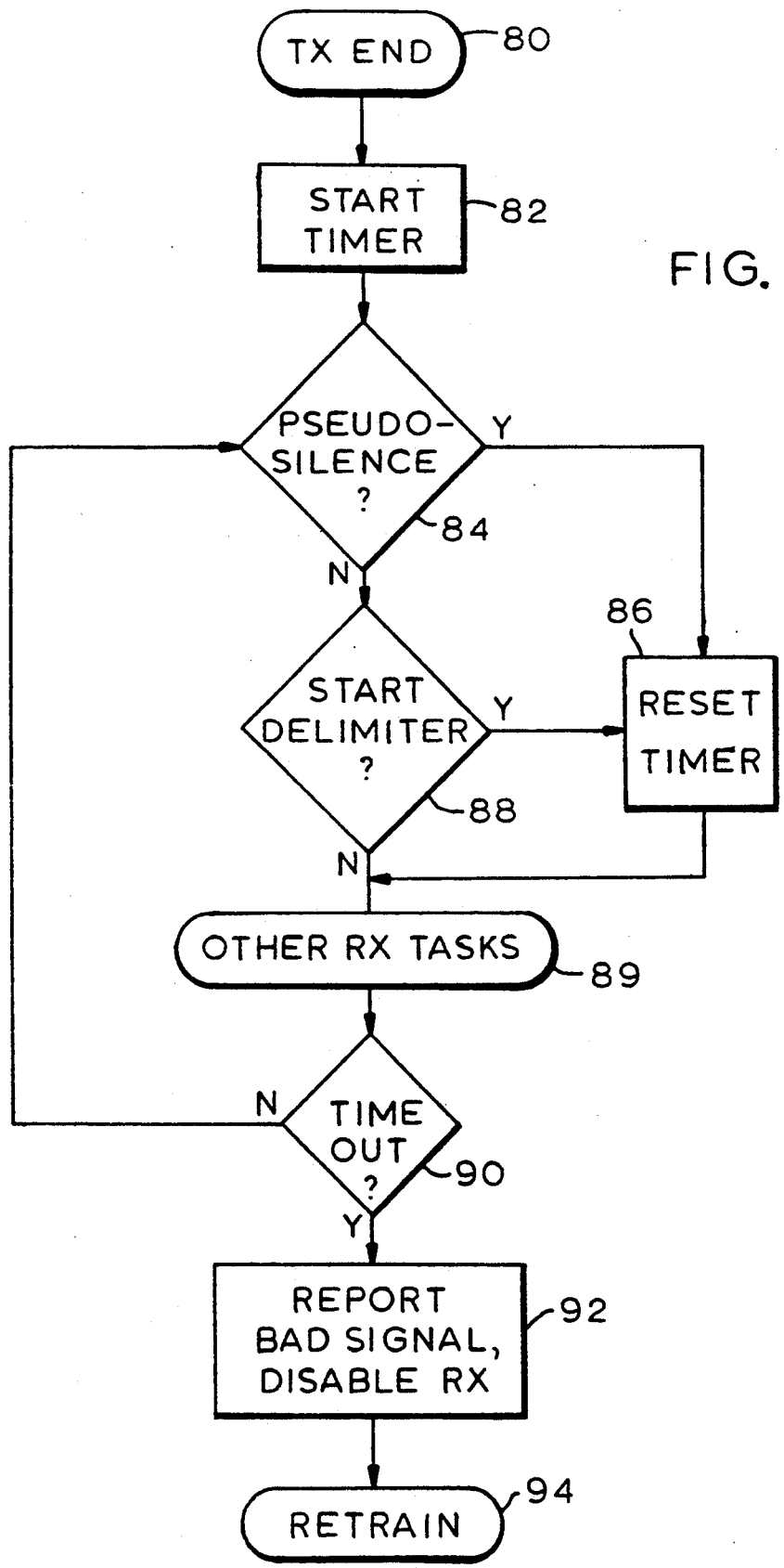

LOCAL AREA NETWORK MODEM

FIELD OF THE INVENTION

This invention relates generally to data communications, and particularly to the design of local area network modems.

BACKGROUND OF THE INVENTION

Until the 1970's computer manufacturers often designed equipment which operated only in conformance with their own proprietary specifications. This approach was adequate when most computer installations consisted of large central processors performing local batch processing and/or time sharing.

By the 1980's, however, distributed processing by mini-computers and especially personal computers had become quite popular. Users of such system quickly realized that it was no longer easy for them to share data with this arrangement, especially between different types of computers. With a need for a common high-speed data communication protocol being evident, the Institute of Electrical and Electronic Engineers (IEEE) began Project 802 to develop an Open Standard Interconnect (OSI) specification which would be available for use by all computer manufacturers. The OSI would enable efficient inter-communication between computers connected in a local area network (LAN), without the need for end users to worry about implementation details that might vary from manufacturer to manufacturer.

Two conclusions were quickly reached in the course of the IEEE's project. First, getting different computers to communicate is a complex problem because of the diversity of their design. Solving that problem requires architecture decisions not only at low levels, such as the physical wiring and modulation scheme, but also at higher levels, such as computer's operating system. The IEEE thus developed an OSI LAN reference model having three "layers". A first, physical layer is concerned with the nature of the transmission medium. A second layer, called the media access control (MAC) layer, specifies the details of signalling along the physical layer. A final layer, called the logical link control (LLC) layer, is concerned with establishing, maintaining, and terminating links between devices.

The other conclusion reluctantly reached by the IEEE was that no single physical-layer architecture would be ideal for all situations. Performance can be sacrificed for lower cost in some applications, such as the typical office environment. The IEEE represents its 802.3 Standard, also known as Ethernet, as ideal for that application. In critical environments such as factories, users will spend more money to have a network which is more robust. An IEEE 802.4 token-passing standard was developed for those applications.

Several manufacturers presently provide modems compatible with the IEEE 802.4 standard. However, these first-generation modem designs do not perform ideally in all situations, especially because of the stringent signaling requirements of the physical layer, which dictate high-speed transmission, and low bit error rates.

In order to provide functions such as loopback typically required in a data modem, the modem transmitter and receiver need to be phase locked. The problem of phase synchronism is exacerbated by the fact that the MAC layer cable between the modem and the upper-layer controller can be of varying lengths, introducing unpredictable delays over that interface.

The encoding function of the transmitter presents difficult design requirements to avoid ground-loop problems, since the digital portion of the modem transmitter is often physically removed from the analog portion. The more signals are passed between these portions, the more difficult it is to obtain the desired noise immunity. Additionally, it is desirable to minimize the number of input/output signal pins on application-specific integrated circuits (ASICs) used to implement the digital portion of the modem.

Several signalling problems arise at the modem receiver as well. One is that of insuring that of the receiver is phase- and frequency-synchronized to a receiver clock with its automatic gain control circuit operating correctly before the higher-order MAC and LLC layers are allowed to begin communication.

A related problem is that certain existing automatic gain control (AGC) circuits are particularly susceptible to noise corruption while the receiver is being synchronized.

The receiver should also monitor itself so that it will automatically attempt to relock without requiring periodic status interrupts from the controller.

Another problem occurs in the operation of the AGC itself. Some prior designs, although having the ability to quickly and accurately set the proper AGC level in most instances, could not reach the proper level under noisy conditions. Such designs typically first set the AGC to a maximum gain level. In a first, coarse-adjustment mode, the AGC's gain level is continuously reduced until a threshold point is reached. Then a fine-adjustment mode is enabled where the level of received symbols having a nominal level corresponding to the maximum possible correct receiver level are tested against a threshold. If these are detected to be low, the AGC gain is increased. A problem with this approach, however, is that it does not allow pulling the AGC level back up if the coarse adjustment has reduced it too much, as may be caused by a noise pulse, since the highest symbol level will never be detected.

SUMMARY OF THE INVENTION

It is among the objects of this invention to provide an improved local area network modem architecture so that stringent signalling performance requirements can be more easily met.

Briefly, a local area network modem in accordance with the invention has several features. It includes a transmitter portion having a symbol encoder, a transmitter state machine, and a first-in first-out memory disposed between an upper layer interface and the transmitter state machine. The transmitter state machine outputs two signals to indicate which one of five possible symbols are to be encoded by the encoder.

The modem also includes a receiver portion having an automatic gain control circuit, a symbol detector, a receiver state machine, a phase-locked loop, and a timer. The automatic gain control circuit receives coarse- and fine-adjustment inputs controlled by the receiver state machine, which does not enable the fine-adjustment mode until a pseudo-silence sequence is received from the network. The phase lock loop operates on the derivative of the output of the automatic gain control circuit to provide receiver and transmitter clock signals, and it can be reset by the receiver state machine. The receiver state machine also receives a status signal from the transmitter state machine, and will automatically reinitialize the automatic gain control circuit and phase-locked loop when needed.

Additionally, the automatic-gain- control circuit may include an averaging peak detector with its output coupled to a buffer amplifier. The buffer-amplifier signal output is connected to charge a capacitor, and its on/off control receives the coarse-adjustment output of the receiver state machine. The fine adjust control is coupled to the capacitor as well.

There are several advantages to this arrangement. The first-in first-out memory allows the receiver and transmitter state machine portions of the modem to remain synchronized, even though the signalling delay through the upper layer interface may vary, with the distance between the modem and an upper-layer controller. The two-wire transmit signalling scheme minimizes the number of wires at the transmitter digital-to-analog interface.

Additionally, the receiver state machine automatically monitors the receiver automatic gain control and phase-locked loop so that intervention from an upper layer is not needed to retrain those circuits when proper synchronization and amplitude adjustment are lost.

Furthermore, the automatic gain control circuit uses a single capacitor to obtain both coarse and fine adjustment.

BRIEF DESCRIPTION OF THE DRAWINGS

The above and further features and advantages of the invention may be better understood by referring to the following description in conjunction with the accompanying drawings, in which:

FIG. 2 is a truth table illustrating the signalling between the modem's transmitter digital portion and its encoder;

FIGS. 3A and 3B are flow charts of a sequence of steps followed by a receiver state machine portion of the modem.

DETAILED DESCRIPTION OF AN ILLUSTRATIVE EMBODIMENT

Figure 1:
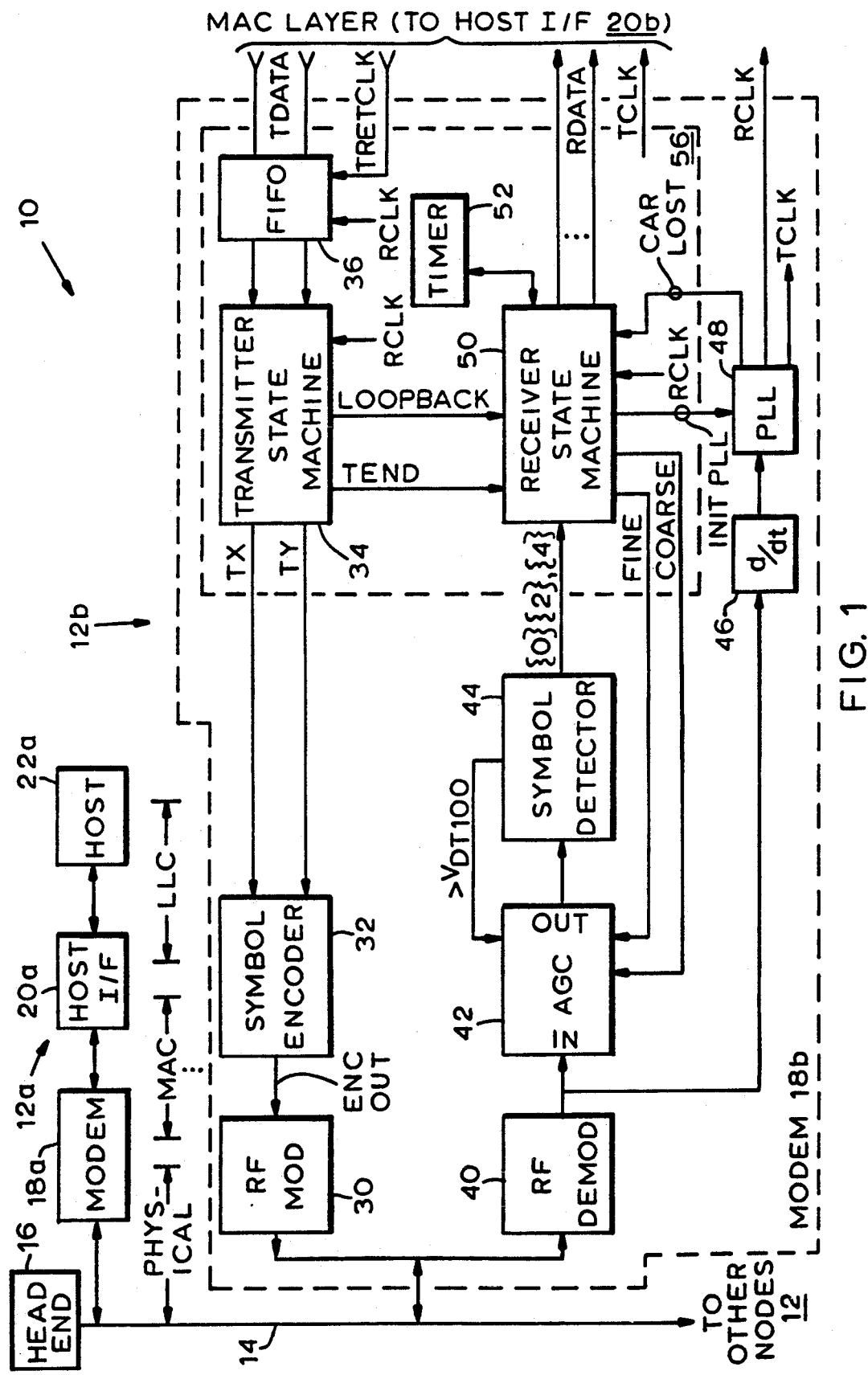
FIG. 1 is a block diagram of a local area network that makes use of a modem constructed in accordance with the invention.

FIG. 1 is a block diagram of a local area network (LAN) 10 in which one embodiment of the invention may be used to meet the stringent signalling requirements of the IEEE 802.4 LAN standard. Network nodes 12a, 12b, and other nodes not shown in the figure (collectively, nodes 12) communicate with one another over a broadband transmission medium such as a coaxial cable 14. LAN 10 also includes a head end remodulator 16 which receives and detects the signals transmitted by a sending node 12 and reconstructs and retransmits these signals before they are received by another, destination node 12.

From the point of view of LAN 10, the functions of the data processing equipment located at an exemplary node 12a are generally divided into a modem 18a, host interface 20a, and host computer 22a. LAN equipment manufacturers typically sell both the modem 18a and a customized host interface 20a for a particular host computer, such as the International Business Machines Personal Computer (IBM PC).

The various layers of the IEEE 802.4 standard's reference model are also shown in FIG. 1. These include the interface between the medium 14 and modem 18a, or physical layer, the interface between the modem 18a and the host interface 20a, or media access control (MAC) layer, and the interface between the host interface 20a and the host 22a, or logical link control (LLC) layer.

FIG. 1 includes a block diagram of an exemplary IEEE 804.2 modem 18b which uses the invention. Modem 18b, a part of node 12b, includes transmitter and receiver components which operate conventionally for the most part in accordance with the standard, but which also perform ceratin novel functions in order to better meet the signalling requirements of the LAN. Before discussing the details of this invention, the overall configuration of the modem should be understood.

The transmitter portion includes a radio frequency modulator 30, symbol encoder 32, transmitter state machine 34, and first-in first-out memory (FIFO) 36.

Transmit data and control signals (TDATA), and a transmit return clock (TRETCLK) are passed to modem 18b over the media access control (MAC) layer from host interface 20b (not shown). The TDATA signals pass through the FIFO 36 to the transmitter state machine 34.

Transmitter state machine 34 performs several operations on the TDATA signals in a known fashion in accordance with the 802.4 standard, including data scrambling and substitution (or kicking). Transmitter state machine 34 also formats the data into frames by inserting control, delimiter, destination address, and checksum symbol sequences. The transmitter state machine 34 transmits the completed frame as transmit symbol command signals (TX, TY) to encoder 32. The transmitter state machine 34 also outputs a transmit end signal (TEND) and loopback signal (LOOPBACK) to indicate, respectively, that the transmitter has finished and that loopback mode is being requested from the host interface 20b.

As will be described in greater detail shortly, from these two transmit symbol command signals TX,TY, encoder 32 is able to generate a duobinary encoded waveform (ENC OUT) in accordance with the 802.4 standard. The ENC OUT signal is then fed to the modulator 30 and out onto the medium 14 with the standard-required amplitude modulation/phase shift keyed (AM/PSK) modulation.

The receiver portion of the modem includes a demodulator 40, automatic gain control circuit (AGC) 42, symbol detector 44, differentiator 46, phase locked loop 48, receiver state machine 50, and timer 52.

Demodulator 40 operates on the duobinary AM/PSK signal received over the medium 14 and provides a demodulated baseband signal to the AGC 42.

AGC 42 adjusts the level of this signal based upon the state of the FINE and COARSE outputs of the receiver state machine 50 and an AGC trim signal ($>$Vdt100) output from the detector 44.

Detector 44 uses several comparators to determine which one of three possible symbols, data 0 ({0}), data 1 ({4}), or control ({2}) is presently being received, in conventional fashion.

Differentiator 46 and phase lock loop 48 operate on the output of demodulator 40 to provide a receiver clocked signal (RCLK) to the various components of modem 18b. Phase locked loop 48 also generates a transmitter clock signal (TCLK) which is phase-locked to the RCLK signal. (TCLK may also be the same signal as RCLK, if desired). The TCLK signal is sent over the MAC layer to the host interface 20b.

The receiver state machine 50 performs receiver functions required by the standard, including resubstitution, unscrambling, and deciphering of control information. It then develops receive data and control signals (RDATA) from this information to be passed over the MAC layer interface to host interface 20b.

In accordance with this invention, receiver state machine 50 also performs other functions. It uses the LOOPBACK signal from transmitter state machine 34 to enter a loopback mode whereby data received by transmitter state machine 34 from the MAC layer interface is directly routed back to the MAC layer interface, without being transmitted over the medium 14. It also generates the COARSE and FINE signals to train the AGC 42. Receiver state machine 50 can also command phase locked loop 48 via the initialize phase locked signal (INIT PLL) to retrain, as well as instruct the AGC 42 to retrain upon indication of a lost carrier signal via the carrier lost signal (CAR LOST) from phase locked loop 48.

Timer 52 is used by receiver state machine 50 to determine when retraining of AGC 42 and phase locked loop 48 is necessary.

The transmitter state machine 34, FIFO 36, receiver state machine 50, and timer 52 are typically all digital circuits, which can be fabricated on a single application specific integrated circuit (ASIC) chip 56, but are probably always at a minimum located on the same portion of a circuit board.

The operation of the modem 18b will now be discussed in detail, so that those of skill in the art can better appreciate its novel features and advantages. FIFO 36 is used to synchronize the transmitter and receiver, regardless of the length of cable used to communicate signals between modem 18b and host interface 20b. This is accomplished by sending the TCLK signal to the MAC layer together with the RDATA and RCLK signals. Host interface 20b returns TCLK, as TRETCLK, back to the modem 18b with the TDATA signals. TRETCLK is then used to clock data into FIFO 36. Since the TDATA and TRETCLK signals will experience the same delay when sent from the host interface 20b, FIFO 36 will correctly sample the TDATA signals. However, the RCLK signal, which is the same signal used to clock receiver state machine 50, controls the clocking of data out of the FIFO 36. Thus receiver state machine 50 and transmitter state machine 34 can remain phase-locked.

This arrangement allows the cabling for the MAC layer interface to be arbitrarily long, and still maintain the ability to do loopback functions.

The transmitter of modem 18b also uses a minimum number of wires for the transmitter state machine 34 to communicate with the encoder 32. As previously alluded to, the IEEE 802.4 requires modem 18b to transmit, at any given time, one of three possible symbols data 0 (called a {0} symbol), data 1 (symbol {4}), and control (symbol {2}). The standard dictates that each of the data symbols be sent as a number of pulses. The way this works is that at any time, either a positive amplitude pulse ("+"), a negative amplitude pulse ("−"), or no pulse is sent. The standard also requires that the pulses be filtered by a cosine-weighted filter such that the pulses' duration exceeds the duration of a symbol. As is known, this minimizes the required signalling bandwidth on the medium 14. The transmitter must also send the correct type of pulses directly after the transmitter is first turned on, and right before the transmitter is turned off.

So, there would appear to be at least five instructions that transmitter state machine 34 must be able to give to encoder 32. FIG. 2 is a truth table that shows how the invention accomplishes this with only two digital signal lines, TX and TY, or four different commands. The four states of TX and TY represent a command to the encoder 32 to transmit a symbol {4}, a symbol {0}, turn the transmitter on, or turn it off, represented by the inputs T_4, T_0, T_ON, and T_OFF in the table.

Encoder 32 operates on these inputs as follows. When it sees a T_4, it outputs a pulses of the same polarity on the ENC OUT signal line. This has the effect of keeping the direct current (DC) level of the ENC OUT signal at the required symbol {4} level. When encoder 32 sees a T_0, it outputs a pulse having the opposite polarity as the preceding pulse. This has the effect of keeping the ENC OUT signal at an average zero volt level, which is proper for symbol {0}.

Now the difficult part concerns transmission of {2} symbols. The design of modem 18b is simplified by taking into account the fact that symbol {2}'s always occur in pairs, except at the point when the transmitter is turned on or turned off. To generate a pair of {2} symbols, the transmitter state machine 34 sends a T_OFF command directly followed by a T_ON command. The T_OFF sends no pulses, and the T_ON causes the last polarity of pulse, regardless of whether it was + or −, and regardless of how long ago it was sent, to be transmitted. Encoder 32 thus has a memory, preferably digital, to keep track of which polarity pulse was last sent. The combined effect of a T_OFF followed by T_ON is to drop or raise the signal amplitude on the ENC OUT line to the required symbol {2} for two symbol periods. The only restriction placed on transmitter state machine 34 by this arrangement is that a T_ON command must always follow a T_OFF command, and that a T_ON command cannot be repeated in adjacent symbol times.

We now consider other novel features and advantages of the receiver portion of modem 18b. As previously mentioned, it is necessary there to determine whether reception conditions over the medium 14 have worsened enough to report that fact to the MAC layer and, shut down the receiver, and retrain the receiver's AGC 42 and phase locked loop 48. Whenever possible, the need for retraining should be automatically determined by receiver state machine 50 without interrupting the MAC layer software. After the retraining process, the receiver state machine 50 should wait a while before reporting that it is ready to receive since, for example, if the AGC 42 has not completely adapted, the received signalling from medium 14 may be full of errors.

Figure 3A:
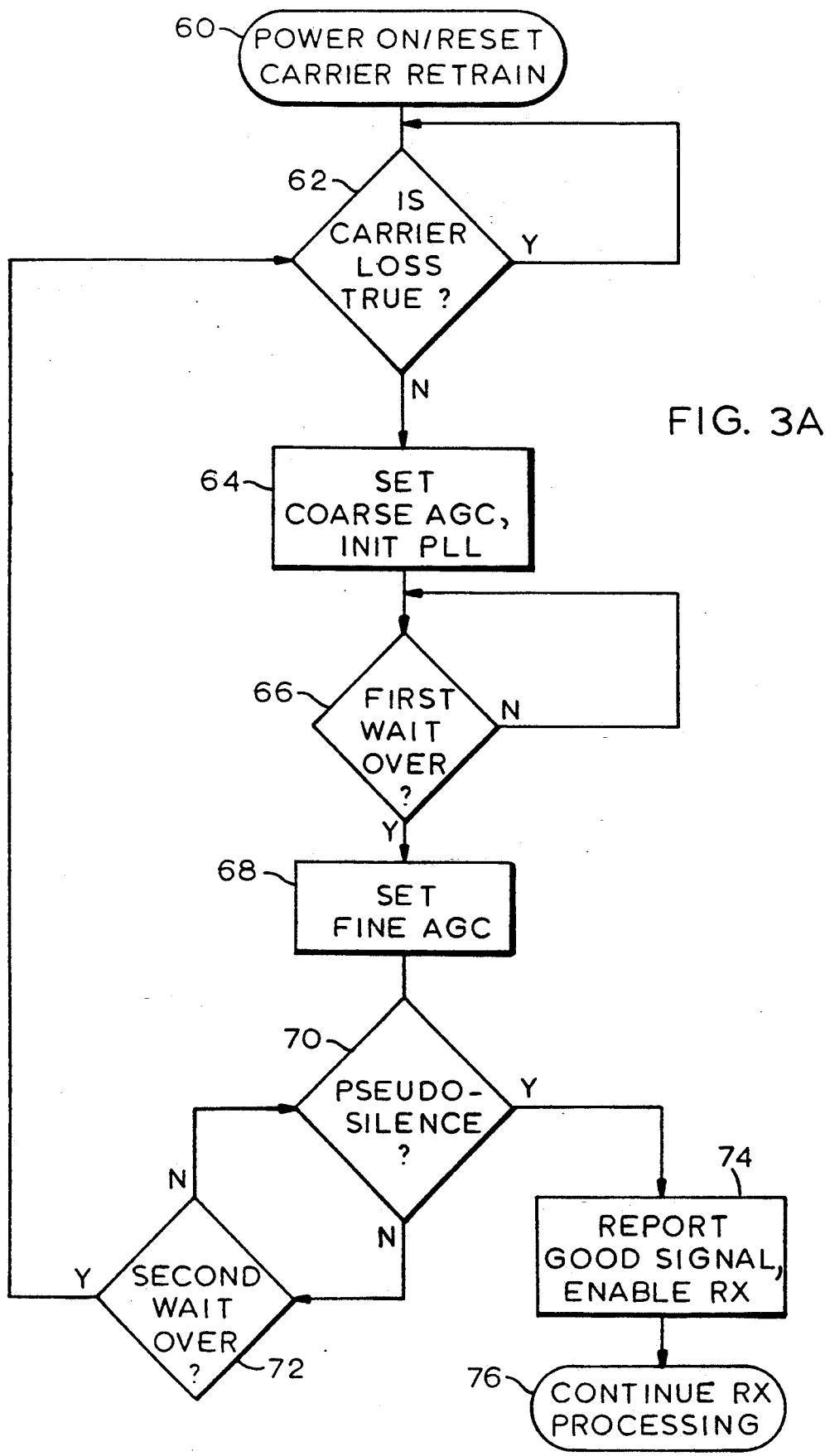

FIG. 3A is a flow chart showing the steps executed by receiver state machine 50, AGC 42, and phase locked loop 48 during retraining. The first step 60 is entered when a power/on reset command is given to the entire modem 18b, when the phase locked loop 48 indicates carrier loss by asserting CAR LOST, or when it is otherwise determined that retraining is necessary, as will be discussed in connection with FIG. 3B. Step 62 causes receiver state machine 50 to wait until a carrier is again present. When that happens, step 64 is next executed, where the COARSE signal is asserted to set AGC 42 into a coarse adjust mode, and the phase locked loop 48 is given a command to minimize phase error.

The next step is to wait an appropriate period of time, which should be something much longer than the duration of a maximum length message transmitted over medium 14. For the IEEE 802.4 standard, maximum message length is about 100,000 bits, and for the preferred embodiment of this invention, the wait imposed in step 66 is about 32,000 bit times. During this period, the receiver continues to report bad signal status over the MAC layer. Timer 52 can be used to perform this waiting.

When the wait is over, step 62 asserts the FINE signal that it sends to the AGC 42. It is then determined by receiver state machine 50 if a so-called pseudo-silence sequence has been received. (As defined by the IEEE 802.4 standard, this sequence is a repeating string of {2}{2}{0}{4} symbols). If this is being received, then good signal is reported to the MAC layer and the receiver is enabled for continued processing of received symbols in steps 74 and 76.

If pseudo-silence was not received in step 70, then step 72 determines if a second waiting period has expired. If not, the testing for pseudo-silence continues. This duration of the second waiting period should be the same as that of the first waiting period.

If the second waiting period expires without detection of pseudo-silence, then it is concluded that the receiver has not trained properly, and receiver state machine 50 returns to step 62, resetting the AGC to COARSE, and reinitializing the phase locked loop 48.

Unlike other approaches, then, the receiver state machine 50 does not decide that the receiver is properly trained until pseudo-silence is received, since pseudo-silence reception requires a high signal to noise ratio condition to exist. That is because the correct detection of a symbol {2} is the most difficult, since it is represented by a physical signal level between the levels used for symbol {4} and {0}), and becuase pseudo-silence has the most number of {2}'s.

Receiver state machine 50 also makes decisions immediately after transmitter state machine 34 indicates that it has finished transmitting. Because of the nature of the IEEE 802.4 token bus protocol, modem 18b is never allowed to transmit unless it has first received a token sequence over the medium 14 which indicates permission to transmit together with silence. Thus, a necessary condition for the modem 18b to transmit is that its receiver is correctly trained.

Thus, if receiver state machine 50 immediately enters a mode whereby it monitors receiver conditions as soon as transmission is over, the receiver should be able to remain trained with minimal interference from the upper MAC and LLC layers.

FIG. 3B shows this in detail. Step 80 is executed by receiver state machine 50 when transmitter state machine 34 asserts TEND, indicating that transmission has ended. The timer 52 is then started in step 82. Step 84 determines if pseudo-silence has been received. If so, the timer 52 is reset in step 86. Step 88 tests to determine if a start delimiter has been received, and if so, the timer is reset. In any case, control passes to step 89, which is actually many steps where the receiver state machine 50 performs other of its tasks in accordance with the IEEE 802.4 standard and as already described. At some point however, the timer 52 must be checked to determine if it has timed out, that is, its wait period has elapsed without having been reset in step 86. If not, step 84 is executed again. But if the timer has timed out, indicating that neither pseudo-silence nor start delimiter has been received for the wait period (again, about 32,000 bit times is preferred), then bad signal is reported to the MAC layer and the receiver goes to retrain, as described in FIG. 3A.

As mentioned before, a final problem occurs in the operation of the AGC 42 itself. Some prior designs, although having the ability to quickly and accurately set the proper AGC level in most instances, could not reach the proper level during noisy conditions. In the coarse adjust mode, such designs typically first se the AGC to a maximum gain level, and then continuously reduce the gain until a threshold point is reached. Then a fine adjustment mode is enabled in which the symbol having the highest level, typically the {4} symbol, is tested against a threshold, and if low, the AGC gain is increased. A problem with this approach, however, is that it does not allow the AGC level to rise back up if the coarse adjustment knocks it down too low, since a {4} symbol will never be detected if the received {4} level drops below the next highest symbol level, or {2} level.

Figure 4:
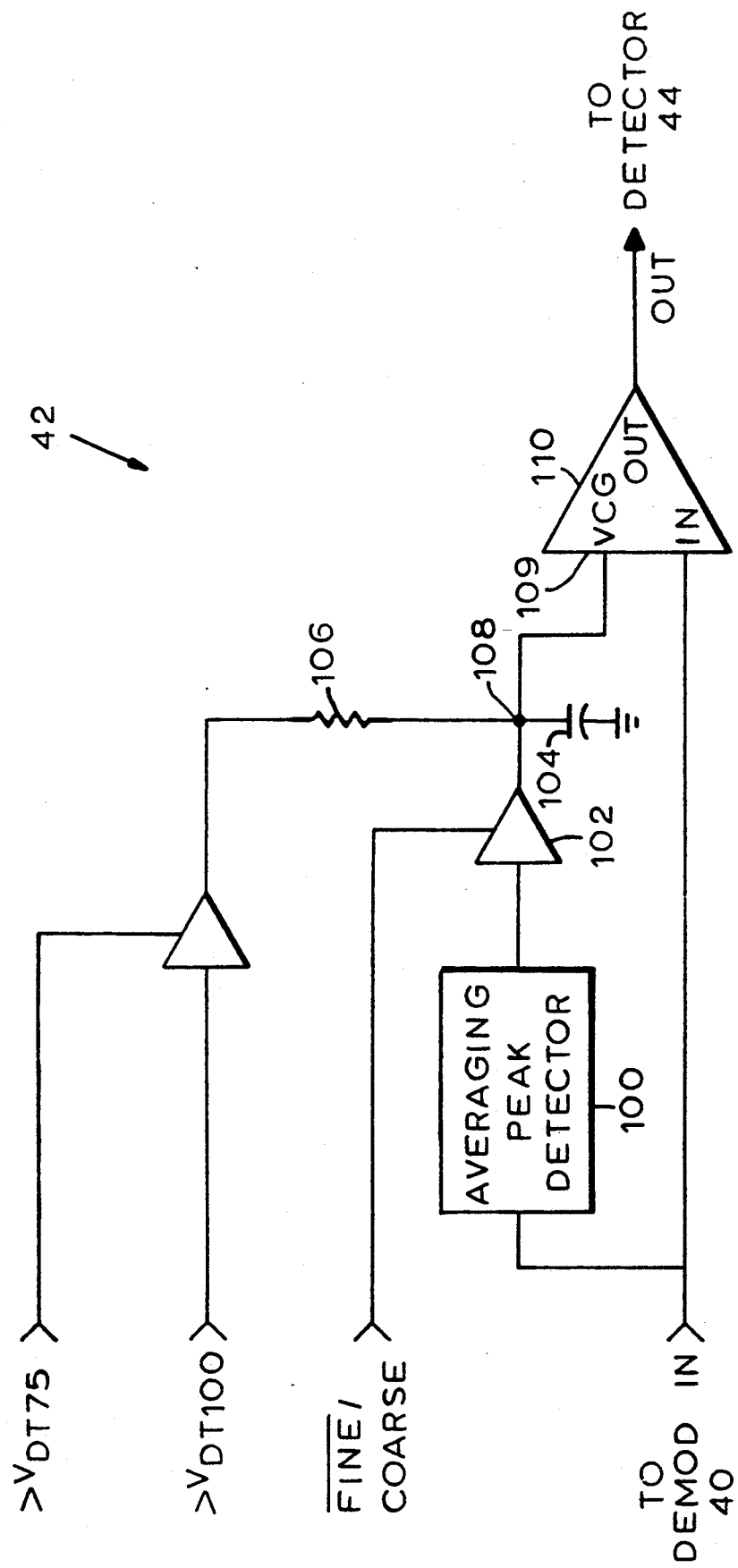
FIG. 4 is a circuit diagram of an automatic gain control circuit used in the modem's receiver.

This invention solves this problem by avoiding the use of a threshold to determine when to switch to fine adjustment mode. An AGC circuit 42 operating in the preferred fashion with the receiver state machine 50 of the invention appears in FIG. 4. An averaging peak detector 100 provides an average received signal level to a buffer amplifier 102. When the receiver state machine 50 asserts COARSE, the course adjustment mode of AGC 42 is entered by enabling the buffer amplifier 102 to pass the output of the peak detector 100 to charge a capacitor 104. The capacitor 104 maintains a voltage at a node 108 which is also forwarded to the gain control input 109 of a voltage-controlled gain signal amplifier 110. Signal amplifier 110 receives the output of demodulator 40. The output of signal amplifier 110 is used as the output of AGC 42 and fed to detector 44.

At some point, when the receiver state machine 50 determines that a fine adjustment mode can be entered, the COARSE input is de-asserted (indicating that FINE mode is desired). This disables the buffer amplifier 102 and hence analog control of the AGC level by peak detector 100, and enables its control by the digital signal >Vdt100. The signal>Vdt100 is asserted when the received level of a symbol {4} is lower than a nominal level, and otherwise unasserted.

In the preferred embodiment, a digital signal>Vdt 75, which indicates when the receive level is greater than 75 percent of the expected nominal symbol [4] level, must also be true before the updating via digital signal>Vdt 100 is allowed to occur.

The illustrated AGC circuit 42 thus provides both course, analog, control as well as fine, digital, control of the AGC level using only a single capacitor. It avoids problems associated with prior circuits, as the course adjustment seeks the proper level right from the start. The single capacitor insures that only small changes in AGC level occur over short periods of time.

The foregoing description has been limited to a specific embodiment of this invention. For example, other physical arrangements would produce the same advantages and results. The same techniques can be used to advantage in a head end 16 as well as a modem 18b.

It is apparent that variations and modifications may be made to the invention, with the attainment of some or all of the advantages of the invention. Therefore, it is the object of the appended claims to cover all such variations and modifications as come within the true spirit and scope of the invention.

I claim:

1. A local area network modem, for modulating data and control information signals received from an interface so they can be transmitted over a signalling medium, the modem comprising:

A. a transmitter portion including:

i. a first-in first-out memory arranged to receive the data and control information signals, and to receive a return clock signal from the interface, the memory having an input clock control coupled to receive the return clock signal, and an output clock control coupled to receive the local clock signal; and ii. transmitter state machine means, for receiving the data and control information signals output by the first-in first-out memory, for operating in phase synchronism with a local clock signal, and for providing a loopback signal; and B. a receiver portion including:

i. means for generating the local clock signal, and for forwarding the local signal over the interface;

ii. receiver state machine means, for receiving the loopback signal, and for operating in phase synchronism with the local clock signal.

2. A local area network modem, for demodulating symbols encoded into a communication signal received from a signalling medium so they can be transmitted as data and control information over a computer interface, comprising:

A. a transmitter portion including:

i. means for providing a transmit end signal; and

B. a receiver portion including:

i. a symbol detector, for determining which of several symbols is presently being received from the signalling medium;

ii. receiver state machine means, for generating coarse and fine automatic gain control signals, the coarse gain control output asserted when the modem enters a training mode, and the fine automatic gain control output asserted only when pseudo-silence symbols are detected by the symbol detector, and for entering a training mode when the transmitter asserts the transmit end signal; and iii. an automatic gain control circuit, for receiving the course and fine automatic gain control signals, and adjusting the amplitude of the communication signal.

3. Apparatus as in claim 2 wherein the automatic gain control circuit additionally comprises:

iv. an averaging peak detector;

v. a capacitor;

vi. a voltage-controlled gain amplifier having its gain control coupled to the capacitor;

vii. a buffer amplifier, arranged to allow the output of the averaging peak detector to charge the capacitor when the coarse automatic gain control signal is asserted;

viii. means for enabling the fine automatic gain control to charge the capacitor when asserted.

4. A local area network modem, for modulating data and control information signals received from an interface so they can be transmitted over a signalling medium, the modem comprising:

A. a transmitter portion including:

i. a first-in first-out memory connected to receive the data and control information signals from the interface, and to receive a return clock signal from the interface, the first-in first-out memory having an input clock control connected to receive the return clock signal, and having an output clock control connected to receive a local clock signal; and ii. a transmitter state machine, connected to receive the data and control information output by the first-in first-out memory, the transmitter state machine connected to the local clock signal to operate in phase synchronism with the local clock signal, and the transmitter state machine also providing a loopback signal; and B. a receiver portion including i. a signal generator connected to provide a local clock signal to the interface; and ii. a receiver state machine, connected to the local clock signal to operate in phase synchronism with the local clock signal, and also connected to receive the loopback signal.

* * * * *